(12) United States Patent
Carralero et al.

(10) Patent No.: US 9,112,381 B2
(45) Date of Patent: Aug. 18, 2015

(54) METHOD AND APPARATUS FOR MANAGING THE DISTRIBUTION OF ELECTRICAL ENERGY IN A POWER DISTRIBUTION GRID

(75) Inventors: Michael A. Carralero, Huntington Beach, CA (US); Jimmy Manansala Quiambao, Walnut, CA (US)

(73) Assignee: THE BOEING COMPANY, Chicago, IL (US)

( * ) Notice: Subject to any disclaimer, the term of this patent is extended or adjusted under 35 U.S.C. 154(b) by 676 days.

(21) Appl. No.: 13/362,868

(22) Filed: Jan. 31, 2012

(65) Prior Publication Data

US 2013/0193767 A1 Aug. 1, 2013

(51) Int. Cl.
*H02J 3/00* (2006.01)
*H02J 3/14* (2006.01)

(52) U.S. Cl.
CPC ............... *H02J 3/14* (2013.01); *Y02B 70/3225* (2013.01); *Y04S 20/222* (2013.01); *Y10T 307/724* (2015.04)

(58) Field of Classification Search
USPC .......................................................... 307/85
See application file for complete search history.

(56) References Cited

U.S. PATENT DOCUMENTS 6,018,449 A    1/2000   Nelson et al.
2011/0208367 A1  8/2011  Sackman et al.

OTHER PUBLICATIONS

Su et al., "Distribution network reconfiguration for loss reduction by ant colony search algorithm," Electric Power Systems Research, vol. 75, Issues 2-3, Aug. 2005, pp. 190-199.
PCT search report dated Jun. 21, 2013 regarding application PCT/US2013/020477, filing date Jun. 7, 2013, applicant reference 11-1081-PCT, applicant The Boeing Company, 7 pages.

*Primary Examiner* — Rexford Barnie
*Assistant Examiner* — Dru Parries
(74) *Attorney, Agent, or Firm* — Yee & Associates, P.C.

(57) ABSTRACT

A power distribution grid comprising a plurality of cells configured to be electrically connected to each other and a power management system. A cell in the plurality of cells is configured to distribute electrical energy to an area corresponding to the cell. The cell has a plurality of entry nodes configured to allow the electrical energy to flow into the cell. The power management system is configured to manage a distribution of the electrical energy to the area by the cell independently of the distribution of the electrical energy to other areas by other cells in the plurality of cells.

20 Claims, 7 Drawing Sheets

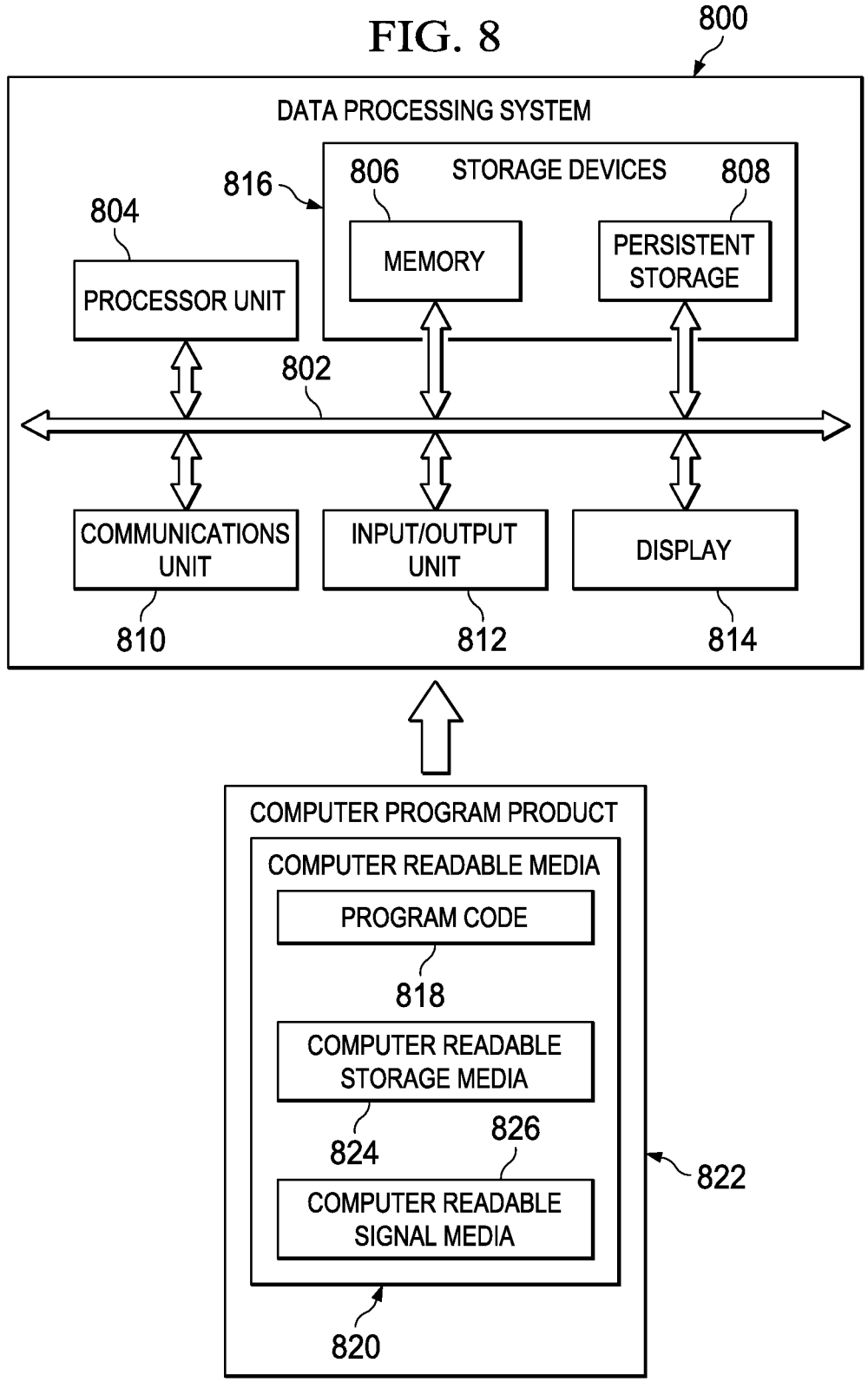

METHOD AND APPARATUS FOR MANAGING THE DISTRIBUTION OF ELECTRICAL ENERGY IN A POWER DISTRIBUTION GRID

BACKGROUND INFORMATION

1. Field

The present disclosure relates generally to a power distribution grid and, in particular, to a method and apparatus for monitoring and controlling the distribution of electrical energy to a plurality of areas in a region using a plurality of cells in the power distribution grid.

2. Background

A power distribution grid may include any number of power lines, transformers, substations, wires, and/or other suitable components configured to deliver electrical energy to one or more loads electrically connected to the power distribution grid. This electrical energy is supplied to the power distribution grid by a power transmission grid. The power transmission grid is configured to transfer electrical energy generated by a power generation system to the power distribution grid.

The power generation system may take a number of different forms. For example, the power generation system may be a power plant, a power generation station, a microgrid, or some other suitable type of power generation system. The electrical energy generated by the power generation system may be generated using, for example, without limitation, mechanical, chemical, thermal, solar, wind, fusion, fission, geothermal, hydroelectric, and/or other suitable types of energy. A power generation system, a power transmission grid, and a power distribution grid may together form a power delivery system. Different portions of a power delivery system may be utilized and operated by different power utilities and consumers.

In some situations, an undesired event may occur within a power distribution grid. An undesired event within a power distribution grid may take the form of, for example, without limitation, a power outage, a short circuit, an inconsistency in one or more components in the power distribution grid, a deviation from a desired quality and/or desired stability for the distribution of electrical energy that is outside of selected tolerances, or some other suitable type of undesired event. In some cases, an undesired event may be referred to as a "fault".

Currently available systems for resolving undesired events that occur within a power distribution grid may require more time, effort, personnel, and/or resources than desired. For example, without limitation, some currently available systems for resolving undesired events that occur within a power distribution grid include dispatching a maintenance crew to the area in which the undesired event has occurred. The maintenance crew may then identify and resolve this undesired event. However, this process may take more time and effort than desired.

For example, when the undesired event is a power outage in a particular area, identifying and locating the cause of the power outage within the particular area may require more time and effort than desired with some currently available systems for managing a power distribution grid. Further, the particular area may experience a loss of power for a longer period of time than desired while the maintenance crew works to identify and locate the cause of the power outage. Therefore, it would be desirable to have a method and apparatus that takes into account at least some of the issues discussed above as well as possibly other issues.

SUMMARY

In one illustrative embodiment, a power distribution grid comprises a plurality of cells configured to be electrically connected to each other and a power management system. A cell in the plurality of cells is configured to distribute electrical energy to an area corresponding to the cell. The cell has a plurality of entry nodes configured to allow the electrical energy to flow into the cell. The power management system is configured to manage a distribution of the electrical energy to the area by the cell independently of the distribution of the electrical energy to other areas by other cells in the plurality of cells.

In another illustrative embodiment, a power distribution grid comprises a plurality of cells configured to be electrically connected to each other, a monitoring system, and a control system. A cell in the plurality of cells is configured to distribute electrical energy to an area corresponding to the cell. The cell has a plurality of entry nodes configured to allow the electrical energy to flow into the cell. The cell comprises a plurality of sectors configured to be electrically connected to each other. A sector in the plurality of sectors is configured to deliver the electrical energy to a load electrically connected to the sector. The sector is configured to have a capability to receive the electrical energy from more than one entry node in the plurality of entry nodes. The monitoring system is configured to monitor a distribution of the electrical energy to the area by the cell independently of the distribution of the electrical energy to other areas by other cells in the plurality of cells. The control system is configured to control the distribution of the electrical energy to the area by the cell independently of the distribution of the electrical energy to the other areas by the other cells in the plurality of cells.

In yet another illustrative embodiment, a method for managing a power distribution grid is provided. A distribution of electrical energy in the power distribution grid is monitored at a plurality of monitoring locations. The power distribution grid comprises a plurality of cells configured to distribute the electrical energy to a plurality of areas. A cell in the plurality of cells has a plurality of entry nodes configured to allow the electrical energy to flow into the cell. A flow of the electrical energy in the plurality of cells is controlled in the power distribution grid at a plurality of control locations. The flow of the electrical energy in the cell in the plurality of cells is controlled independently of the flow of the electrical energy in other cells in the plurality of cells.

The features, functions, and benefits can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

FIG. 8 is an illustration of a data processing system in accordance with an illustrative embodiment.

DETAILED DESCRIPTION

The different illustrative embodiments recognize and take into account different considerations. For example, the different illustrative embodiments recognize and take into account that some currently used configurations for power distribution grids may be unable to begin resolving an undesired event and restore power to an area in which the undesired event has occurred as quickly as desired. The undesired event may be, for example, a power outage.

Further, the different illustrative embodiments recognize and take into account that it may be desirable to have a configuration for a power distribution grid that allows a location in which an undesired event has occurred to be isolated for maintenance while allowing power to be restored to areas around this location. In particular, it may be desirable to have a power distribution grid that is capable of minimizing the area affected by an undesired event.

Thus, the different illustrative embodiments provide a method and apparatus for managing a power distribution grid. In one illustrative embodiment, a power distribution grid comprises a plurality of cells configured to be electrically connected to each other and a power management system. A cell in the plurality of cells is configured to distribute electrical energy to an area corresponding to the cell. The cell has a plurality of entry nodes configured to allow the electrical energy to flow into the cell. The power management system is configured to manage a distribution of the electrical energy to the area by the cell independently of the distribution of the electrical energy to other areas by other cells in the plurality of cells.

Figure 1:
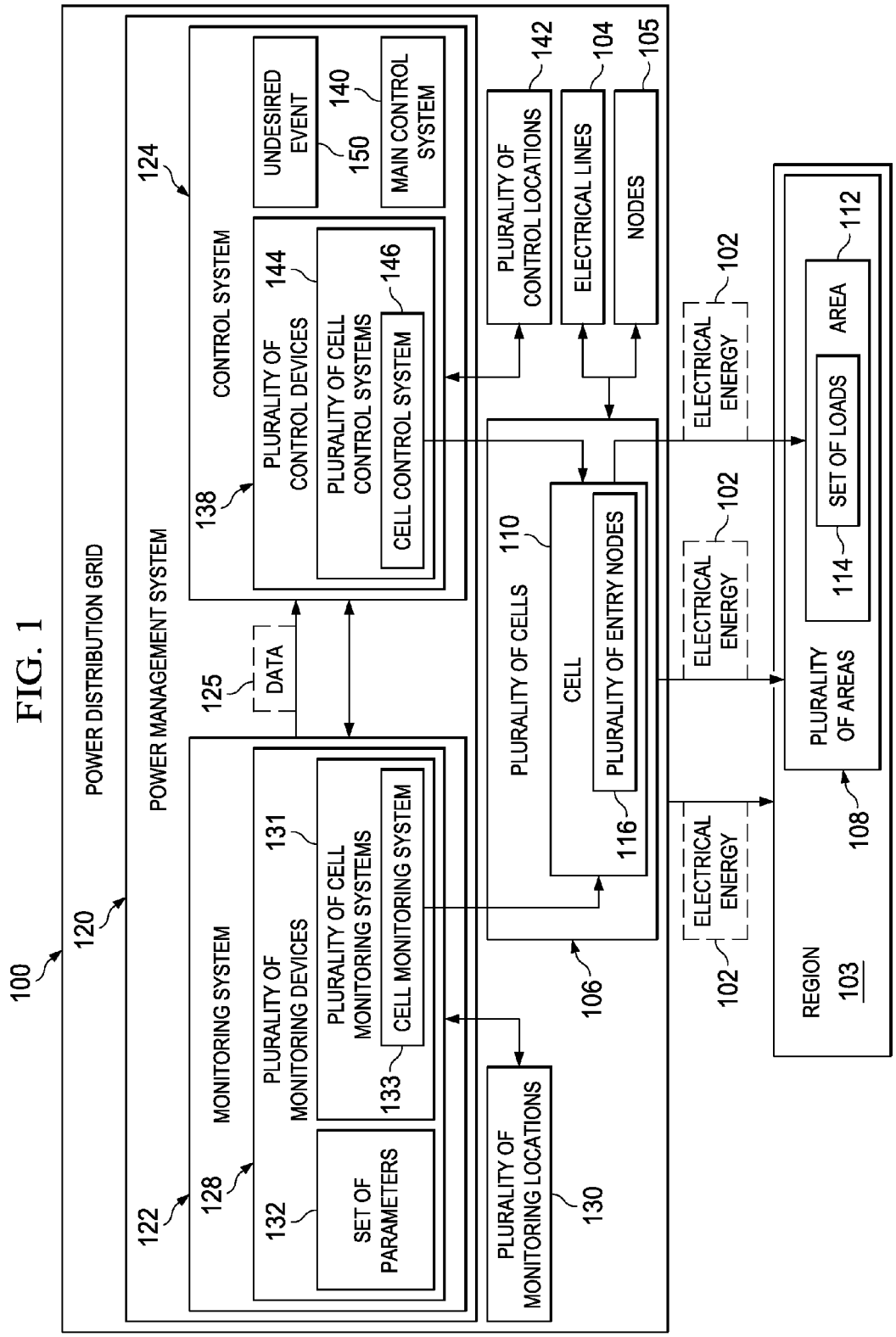
FIG. 1 is an illustration of a power distribution grid in the form of a block diagram in accordance with an illustrative embodiment.

With reference now to the figures and, in particular, with reference to FIG. 1, an illustration of a power distribution grid in the form of a block diagram is depicted in accordance with an illustrative embodiment. Power distribution grid 100 is an example of one manner in which the different illustrative embodiments may be implemented. In some illustrative examples, power distribution grid 100 may be referred to as a power distribution network.

Power distribution grid 100 is configured to distribute electrical energy 102 to region 103. Region 103 may be, for example, without limitation, a geographical region, a city, an area in a city, a town, a neighborhood, or some other suitable type of region.

As used herein, "electrical energy", such as electrical energy 102, is potential energy that results from conservative Coulomb forces. Electrical energy 102 may be measured in, for example, joules (J). The rate at which electrical energy 102 is transferred is referred to as "power", "electrical power", or "electric power". Power may be measured in watts (W). One watt is measured as one joule per second.

Electrical energy 102 may comprise energy generated using, for example, without limitation, at least one of mechanical, chemical, thermal, solar, wind, fusion, fission, geothermal, hydroelectric, and other suitable types of energy. The phrase "at least one of", as used herein, when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C.

Power distribution grid 100 comprises electrical lines 104 and nodes 105. As used herein, an "electrical line" may be any wire, cable, or other suitable type of conduit configured to carry electrical energy 102. In these illustrative examples, an electrical line may also be referred to as a power line, a distribution line, or a power distribution line. Electrical lines 104 may be two or more electrical lines. For example, electrical lines 104 may include two, three, 10, 20, 50, 100, or some other suitable number of electrical lines.

Further, a "node", as used herein, is a connection between two or more electrical lines. This connection may take various forms. For example, without limitation, the connection between two or more electrical lines may comprise at least one of an intersection of two or more electrical lines, a hub, a bus, a busbar, an electrical circuit, a substation, an electrical line connecting two or more electrical lines, or some other suitable type of connection between two or more electrical lines.

Electrical lines 104 and nodes 105 may be configured to form plurality of cells 106 in power distribution grid 100. As used herein, a "plurality of" items means one or more items. For example, plurality of cells 106 means two or more cells.

In these illustrative examples, electrical lines 104 and nodes 105 may be organized into plurality of cells 106 to distribute electrical energy 102 to plurality of areas 108 in region 103. In particular, each cell in plurality of cells 106 is configured to distribute electrical energy 102 to a corresponding area in plurality of areas 108 in region 103. Plurality of areas 108 may be distinct areas that do not overlap within region 103 in these illustrative examples. However, in other illustrative examples, one or more areas in plurality of areas 108 may overlap.

Cell 110 is an example of one of plurality of cells 106. Cell 110 is configured to distribute electrical energy 102 to area 112 in plurality of areas 108. More specifically, cell 110 is configured to deliver electrical energy 102 to set of loads 114 in area 112 that are electrically connected to cell 110.

As used herein, a "set of" items means one or more items. For example, set of loads 114 means one or more loads. Further, as used herein, a "load", such as one of set of loads 114, may be any circuit, system, or device configured to consume electrical energy 102. A load may take various forms. For example, without limitation, a load may be selected from cumulative loads from a manufacturing facility, a building, a home, or one of an appliance, a computer, a car, an electrical device, an electromechanical device, a computer system, or some other suitable type of load.

Further, as used herein, when a first component, such as a load in set of loads 114, is electrically connected to a second component, such as cell 110, the first component is connected to the second component such that electric current can be sent from the first component to the second component, the second component to the first component, or a combination of the two. In other words, the first component and the second component are connected such that electrical energy 102 may flow between the two components. For example, when a load is electrically connected to cell 110, electrical energy 102 may be transferred from cell 110 to the load.

In some cases, the first component may be electrically connected to the second component without any additional components between the two components. In other illustrative examples, the first component may be electrically connected to the second component by one or more other components.

As depicted, cell 110 has plurality of entry nodes 116. An "entry node", as used herein, is a node through which electrical energy 102 flows into a cell. In one illustrative example, cell 110 may have four entry nodes through which electrical energy 102 can flow into cell 110.

One or more of plurality of entry nodes 116 may be used to electrically connect cell 110 to other cells in plurality of cells 106. For example, an entry node in plurality of entry nodes 116 for cell 110 may be used to electrically connect cell 110 to at least one other cell in plurality of cells 106. In these illustrative examples, two cells that are electrically connected to each other by a node may be considered to share that node.

As depicted, power distribution grid 100 also includes power management system 120. Power management system 120 is configured to manage the distribution of electrical energy 102 to region 103 by power distribution grid 100. In these illustrative examples, power management system 120 comprises monitoring system 122 and control system 124.

Monitoring system 122 is configured to monitor plurality of cells 106 in power distribution grid 100. In particular, monitoring system 122 monitors the distribution of electrical energy 102 to plurality of areas 108 in region 103 by plurality of cells 106.

In these illustrative examples, monitoring system 122 comprises plurality of monitoring devices 128. Plurality of monitoring devices 128 is configured to monitor plurality of monitoring locations 130 in power distribution grid 100. As used herein, a "monitoring location" in power distribution grid 100 is a location along one of electrical lines 104 in power distribution grid 100 being monitored.

Plurality of monitoring devices 128 may form plurality of cell monitoring systems 131 for plurality of cells 106. Each cell monitoring system in plurality of cell monitoring systems 131 is configured to monitor a corresponding cell in plurality of cells 106. For example, cell monitoring system 133 in plurality of cell monitoring systems 131 is configured to monitor cell 110. Cell monitoring system 133 may be configured to monitor cell 110 independently of other cells in plurality of cells 106. In some cases, cell monitoring system 133 may be considered part of cell 110.

Each monitoring device in plurality of monitoring devices 128 is configured to monitor set of parameters 132 at a corresponding location in plurality of monitoring locations 130. More specifically, each monitoring device in plurality of monitoring devices 128 generates data 125 while monitoring set of parameters 132 at a corresponding location in plurality of monitoring locations 130.

Set of parameters 132 may include, for example, parameters related to the distribution of electrical energy 102 at a particular location and/or other suitable parameters. In these illustrative examples, set of parameters 132 includes at least one of voltage, current, frequency, electrical power, electrical energy, temperature, impedance, capacity, thermal conductivity, and other suitable types of parameters.

A monitoring device in plurality of monitoring devices 128 may take various forms. For example, a monitoring device in plurality of monitoring devices 128 may comprise at least one of a voltmeter, an ammeter, an ohmmeter, a power meter, a temperature sensor, a processor unit, a communications unit, and any other suitable type of sensor, meter, or monitoring device capable of monitoring one or more of set of parameters 132. In some cases, plurality of monitoring devices 128 may be configured to communicate with each other.

In these illustrative examples, plurality of monitoring devices 128 is configured to monitor set of parameters 132 at plurality of monitoring locations 130 continuously. Each monitoring device in plurality of monitoring devices 128 generates data 125 while monitoring a particular location in plurality of monitoring locations 130. Data 125 may include, for example, without limitation, values for set of parameters 132.

In some illustrative examples, data 125 also may include information derived from values for set of parameters 132. For example, data 125 may include information about the health and/or status of power distribution grid 100 with respect to the particular location. In other illustrative examples, data 125 may include at least one of a report, a log, a spreadsheet, a table, an alert, and other suitable types of data identified by the monitoring device from monitoring set of parameters 132 at the particular location.

A monitoring device in plurality of monitoring devices 128 may generate data 125 continuously over time, periodically, and/or in response to some event. The event may be, for example, receiving a command, receiving a request for data 125, receiving operator input, the lapse of a timer, or some other suitable type of event.

When plurality of monitoring devices 128 monitor plurality of monitoring locations 130 continuously, plurality of monitoring devices 128 may generate data 125 for plurality of monitoring locations 130 in substantially real-time. Generating data 125 in substantially real-time means generating data 125 at the fastest possible speeds without intentional and/or perceivable delays.

In some illustrative examples, data 125 generated by one monitoring device in plurality of monitoring devices 128 may be different from data 125 generated by another monitoring device in plurality of monitoring devices 128. Further, in other illustrative examples, data 125 may be generated continuously by one monitoring device in plurality of monitoring devices 128, while data 125 may be generated periodically by a monitoring device in plurality of monitoring devices 128.

In these illustrative examples, the different monitoring devices in plurality of monitoring devices 128 are configured to send data 125 to control system 124 for processing. Plurality of monitoring devices 128 may send data 125 to control system 124 using a communications network.

This communications network may allow communications between plurality of monitoring devices 128 in monitoring system 122, between plurality of control devices 138 in control system 124, and between monitoring system 122 and control system 124. Further, this communications network may be formed using a number of wireless communications links, a number of wired communications links, one or more of electrical lines 104, a number of optical communications links, and/or other suitable types of communications links. Any configuration for a number of electrical lines 104 in power distribution grid 100 may be used in the communications network.

Control system 124 is configured to control the distribution of electrical energy 102 to region 103 by power distribution grid 100 using data 125 provided by monitoring system 122. In particular, control system 124 controls the flow of electrical energy 102 through electrical lines 104 and nodes 105 in power distribution grid 100.

Further, in controlling the distribution of electrical energy 102 to region 103, control system 124 may be configured to substantially maintain desired power quality and desired power stability with respect to electrical energy 102 delivered to loads in region 103. Still further, control system 124 may substantially maintain synchronization and communication between cells in plurality of cells 106 in power distribution grid 100.

Additionally, control system 124 is configured to control each cell in plurality of cells 106 independently of other cells in plurality of cells 106. For example, control system 124 controls the flow of electrical energy 102 within cell 110 independently of the flow of electrical energy 102 within other cells in plurality of cells 106. In this manner, control system 124 may control the distribution of electrical energy 102 to area 112 by cell 110 independently of the distribution of electrical energy 102 to other areas in plurality of areas 108 by other cells in plurality of cells 106.

In these illustrative examples, control system 124 comprises plurality of control devices 138 and main control system 140. Each control device in plurality of control devices 138 is electrically connected to a corresponding electrical line in electrical lines 104 for power distribution grid 100. Plurality of control devices 138 is configured to control the flow of electrical energy 102 through electrical lines 104 in power distribution grid 100 at plurality of control locations 142.

As used herein, a "control location" is a location along one of electrical lines 104 in power distribution grid 100 at which the flow of electrical energy 102 through the electrical line may be changed. In some cases, a control location in plurality of control locations 142 may be located at substantially the same location as or near to a monitoring location in plurality of monitoring locations 130.

A control device in plurality of control devices 138 may take various forms. For example, a control device in plurality of control devices 138 may comprise at least one of a switch, a switchgear, a flexible alternating current transmissions (FACTs) device, a fuse, a circuit breaker, a smart switch, a protective relay, an electronic filter, a phase shifter, a transformer, an adapter, a sensor, a processor unit, a communications unit, and some other suitable type of component.

A control device in plurality of control devices 138 that is electrically connected to one of electrical lines 104 at a particular location may change the flow of electrical energy 102 at this particular location in a number of different ways. For example, the control device may reduce the amount of electrical energy 102 that can flow through the electrical line at the location, decrease the impedance of the electrical line at the location, increase the impedance of the electrical line at the location, prevent the flow of electrical energy 102 through the electrical line at the location, and/or change the flow of electrical energy 102 though the electrical line at the location in some other suitable manner.

Plurality of control devices 138 may form plurality of cell control systems 144 for plurality of cells 106. Each cell control system in plurality of cell control systems 144 is configured to control a corresponding cell in plurality of cells 106. For example, cell control system 146 in plurality of cell control systems 144 is configured to control cell 110. In some cases, cell control system 146 may be considered part of cell 110.

Cell control system 146 is configured to control the flow of electrical energy 102 through cell 110 independently of the other cells in plurality of cells 106. In particular, cell control system 146 may control the flow of electrical energy 102 through cell 110 using data 125 generated by, for example, cell monitoring system 133.

In these illustrative examples, the portion of plurality of control devices 138 within cell control system 146 may be configured to communicate with each other and with the monitoring devices in cell monitoring system 133 for cell 110. In this manner, cell monitoring system 133 and cell control system 146 may work together to control cell 110. More specifically, cell 110 may use cell monitoring system 133 and cell control system 146 to control cell 110 autonomously. Autonomous control of cell 110 may be control of cell 110 by cell 110 without requiring additional information and/or input from other sources.

Further, in these illustrative examples, main control system 140 may be configured to control operation of at least a portion of plurality of cell monitoring systems 131 and/or at least a portion of plurality of cell control systems 144. In particular, main control system 140 may be in communication with at least a portion of plurality of monitoring devices 128 and/or at least a portion of plurality of control devices 138.

In some illustrative examples, main control system 140 may control the overall distribution of electrical energy 102 to region 103. For example, main control system 140 may use at least a portion of plurality of control devices 138 to control the flow of electrical energy 102 within each of plurality of cells 106.

Further, main control system 140 may use data 125 generated by plurality of monitoring devices 128 and/or other suitable information to control power distribution grid 100. This other information may include, for example, without limitation, a power distribution policy, safety requirements, regulations, consumer requests, and/or other suitable types of information.

In these illustrative examples, the flow of electrical energy 102 in a cell, such as cell 110, may be controlled in a number of different ways. For example, main control system 140 and/or cell control system 146 in control system 124 may control which entry nodes in plurality of entry nodes 116 through which cell 110 is configured to receive electrical energy 102. This control may be based on, for example, data 125 generated by cell monitoring system 133 and/or other suitable information.

Further, control system 124 may also control the flow of electrical energy 102 to set of loads 114 electrically connected to cell 110. For example, control system 124 may use cell control system 146 to control a pathway for electrical energy 102 from one of plurality of entry nodes 116 for cell 110 to a particular load in set of loads 114 electrically connected to cell 110. In this manner, plurality of control devices 138 may have the capability to resolve undesired events, react to deviations from nominal voltage and frequency patterns, and reroute the flow of electrical energy 102 through cell 110. In some cases, resolving undesired events may also be referred to as clearing faults.

In these illustrative examples, control system 124 may use data 125 generated by plurality of monitoring devices 128 to detect the occurrence of undesired event 150. Undesired event 150 may comprise, for example, at least one of an undesired change to the flow of electrical energy 102 in one or more electrical lines 104, a power outage or loss of power in a portion of area 112, a short circuit, an inconsistency in one or more components of a cell, a deviation from a desired power quality and/or desired power stability for the distribution of electrical energy 102 that is outside of selected tolerances, and some other type of undesired event. In some cases, undesired event 150 may be referred to as a "fault".

Undesired event 150 may be any event that affects the distribution of electrical energy 102 to an area in plurality of areas 108 in an undesired manner. As one illustrative example, undesired event 150 may be a power outage in a portion of area 112. This power outage may cause a loss of power to one or more of set of loads 114 electrically connected to cell 110.

Cell control system 146 may detect the occurrence of undesired event 150 using data 125 generated by cell monitoring system 133. In response to detecting undesired event 150, cell control system 146 may use data 125 to determine the portion of cell 110 in which the cause of undesired event 150 is located. Cell control system 146 may then change the flow of electrical energy 102 through cell 110 to compensate for undesired event 150.

In particular, cell control system 146 may isolate the portion of cell 110 in which the cause of undesired event 150 is located. In other words, cell control system 146 may reduce the flow of electrical energy 102 to this portion of cell 110. The flow of electrical energy 102 to this portion of cell 110 may be reduced to about zero. In other words, cell control system 146 may prevent the flow of electrical energy 102 to this portion of cell 110. In this manner, an operator, a maintenance crew, an electrician, a robotic operator, or some other suitable type of operator may be able to investigate and/or resolve the cause of the power outage.

In some cases, isolating this portion of cell 110 may not result in the restoration of power to all of set of loads 114. Consequently, cell control system 146 reroutes the flow of electrical energy 102 through the electrical lines and/or nodes in cell 110 such that power is restored to all of set of loads 114. In some cases, this restoration of power to all of set of loads 114 and the isolation of the portion of cell 110 in which undesired event 150 occurred may occur simultaneously within selected tolerances.

In this manner, monitoring system 122 and control system 124 may be used to manage the flow of electrical energy 102 through plurality of cells 106. Further, monitoring system 122 and control system 124 may be used to manage the flow of electrical energy 102 between cells in plurality of cells 106. For example, monitoring system 122 and control system 124 may manage the flow of electrical energy 102 through entry nodes that electrically connect cells in plurality of cells 106.

With monitoring system 122 continuously monitoring power distribution grid 100, control system 124 may be able to isolate undesired events, minimize the portion of an area affected by the undesired event, and restore power to the area more quickly and efficiently as compared to currently available systems for managing a power distribution grid. In some cases, continuous monitoring of power distribution grid 100 may allow control system 124 to monitor power distribution grid 100 and resolve undesired events that may occur within power distribution grid 100 in substantially real-time.

The illustration of power distribution grid 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some illustrative examples, monitoring system 122 and control system 124 may have shared components. As one illustrative example, cell monitoring system 133 and cell control system 146 may be part of the same device in some cases. Further, in some cases, power distribution grid 100 may include additional components in addition to and/or in place of the ones described above. For example, power distribution grid 100 may also include any number of protective relays, voltage and current transformers, circuit breakers, fuses, control stations, and/or other suitable types of components.

In other illustrative examples, a portion of each cell control system in plurality of cell control systems 144 for a corresponding cell in plurality of cells 106 may be located remote to the area in plurality of areas 108 corresponding to that cell. As one illustrative example, cell control system 146 may include a computer system located remote to area 112 and configured to control the control devices in cell control system 146 remotely. For example, the control devices in cell control system 146 may take the form of switches that may be controlled remotely by a computer system in cell control system 146.

In some illustrative examples, a cell in plurality of cells 106 may be part of another cell in plurality of cells 106. A cell that is part of another cell in plurality of cells 106 distributes electrical energy 102 to an area located within the area corresponding to the other cell. A cell within another cell may be referred to as a "sub-cell" in these illustrative examples. A cell in plurality of cells 106 may have any number of sub-cells.

Figure 2:
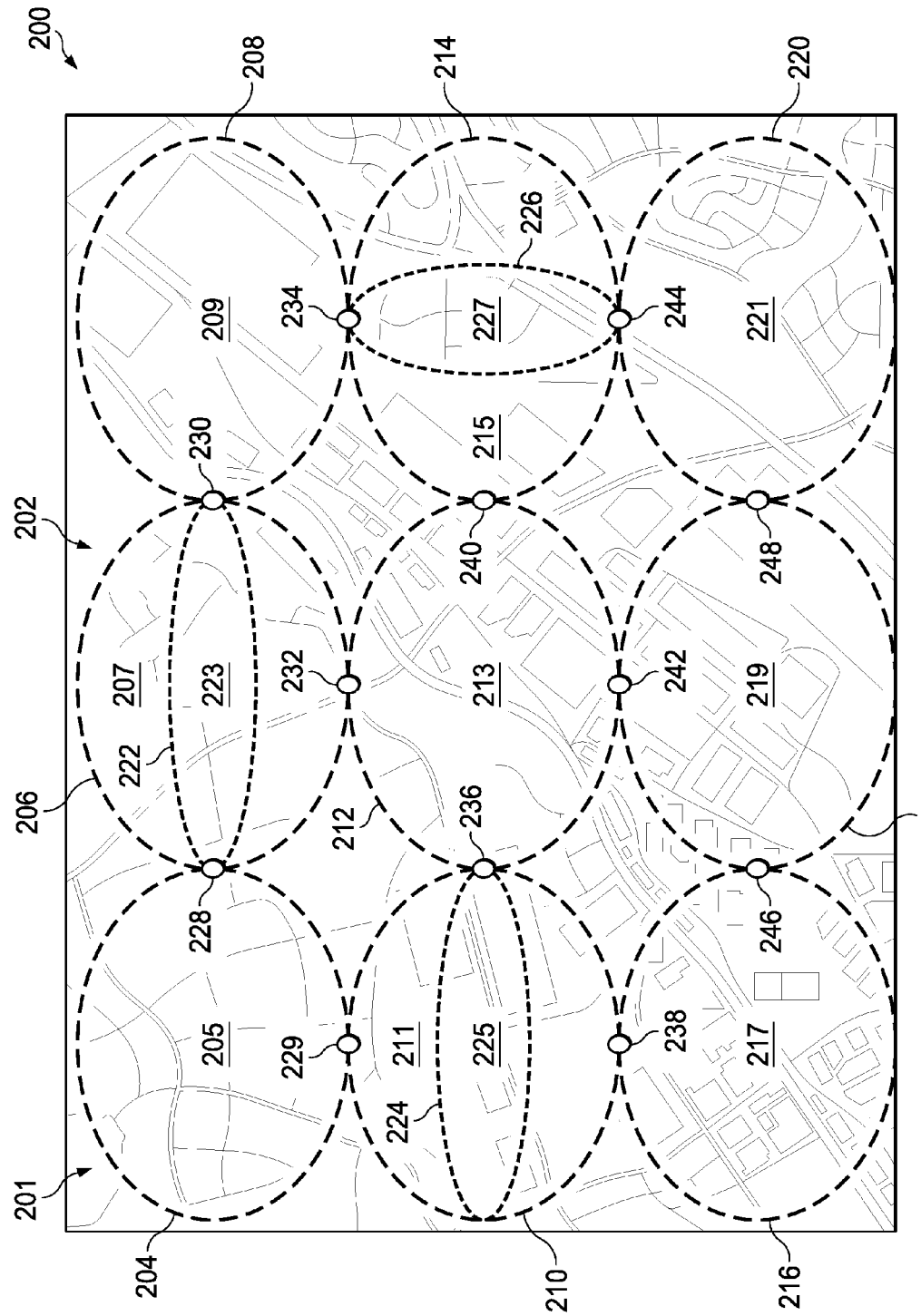
FIG. 2 is an illustration of a power distribution grid in accordance with an illustrative embodiment.

With reference now to FIG. 2, an illustration of a power distribution grid is depicted in accordance with an illustrative embodiment. Power distribution grid 200 is an example of one implementation for power distribution grid 100 in FIG. 1. Power distribution grid 200 is configured to deliver power to loads within region 201. In this illustrative example, region 201 is a region in a city.

As depicted, power distribution grid 200 comprises plurality of cells 202. Plurality of cells 202 includes cell 204, cell 206, cell 208, cell 210, cell 212, cell 214, cell 216, cell 218, and cell 220. Each of these cells is configured to deliver power to a corresponding area in region 201. For example, cell 204, cell 206, cell 208, cell 210, cell 212, cell 214, cell 216, cell 218, and cell 220 are configured to deliver power to loads within area 205, area 207, area 209, area 211, area 213, area 215, area 217, area 219, and area 221, respectively.

Plurality of cells 202 may cooperatively control the distribution of power within region 201. However, in this illustrative example, each cell in plurality of cells 202 also may be configured to be independent of the other cells in plurality of cells 202. For example, a cell in plurality of cells 202, such as cell 204, may be configured to monitor the distribution of power within cell 204 independently of the other cells in plurality of cells 202. Further, this cell may be configured to control the distribution of power within that cell independently of the other cells in plurality of cells 202.

Further, as depicted, in some cases, a cell may have a sub-cell. The sub-cell is configured to deliver power to a sub-area within the area corresponding to the cell to which the sub-cell belongs. For example, cell 206 has sub-cell 222, cell 210 has sub-cell 224, and cell 214 has sub-cell 226. Sub-cell 222, sub-cell 224, and sub-cell 226 are configured to deliver power to sub-area 223, sub-area 225, and sub-area 227, respectively.

In this illustrative example, a sub-cell may monitor and control the distribution of power within the sub-cell independently of the cell to which the sub-cell belongs. For example, sub-cell 222 may monitor and control the distribution of power within sub-cell 222 independently of cell 206.

As depicted, plurality of cells 202 are connected to each other by entry nodes. In particular, a cell may share one or more entry nodes with one or more other cells in plurality of cells 202. For example, cell 204 and cell 206 share entry node 228. Cell 204 and cell 210 share entry node 229. Cell 206 shares entry node 230 with cell 208 and entry node 232 with cell 212. Cell 208 shares entry node 234 with cell 214.

Further, cell 210 shares entry node 236 with cell 212 and entry node 238 with cell 216. Cell 212 shares entry node 240 with cell 214 and entry node 242 with cell 218. Additionally, cell 214 shares entry node 244 with cell 220. Cell 216 shares entry node 246 with cell 218. Cell 218 shares entry node 248 with cell 220.

Figure 3:
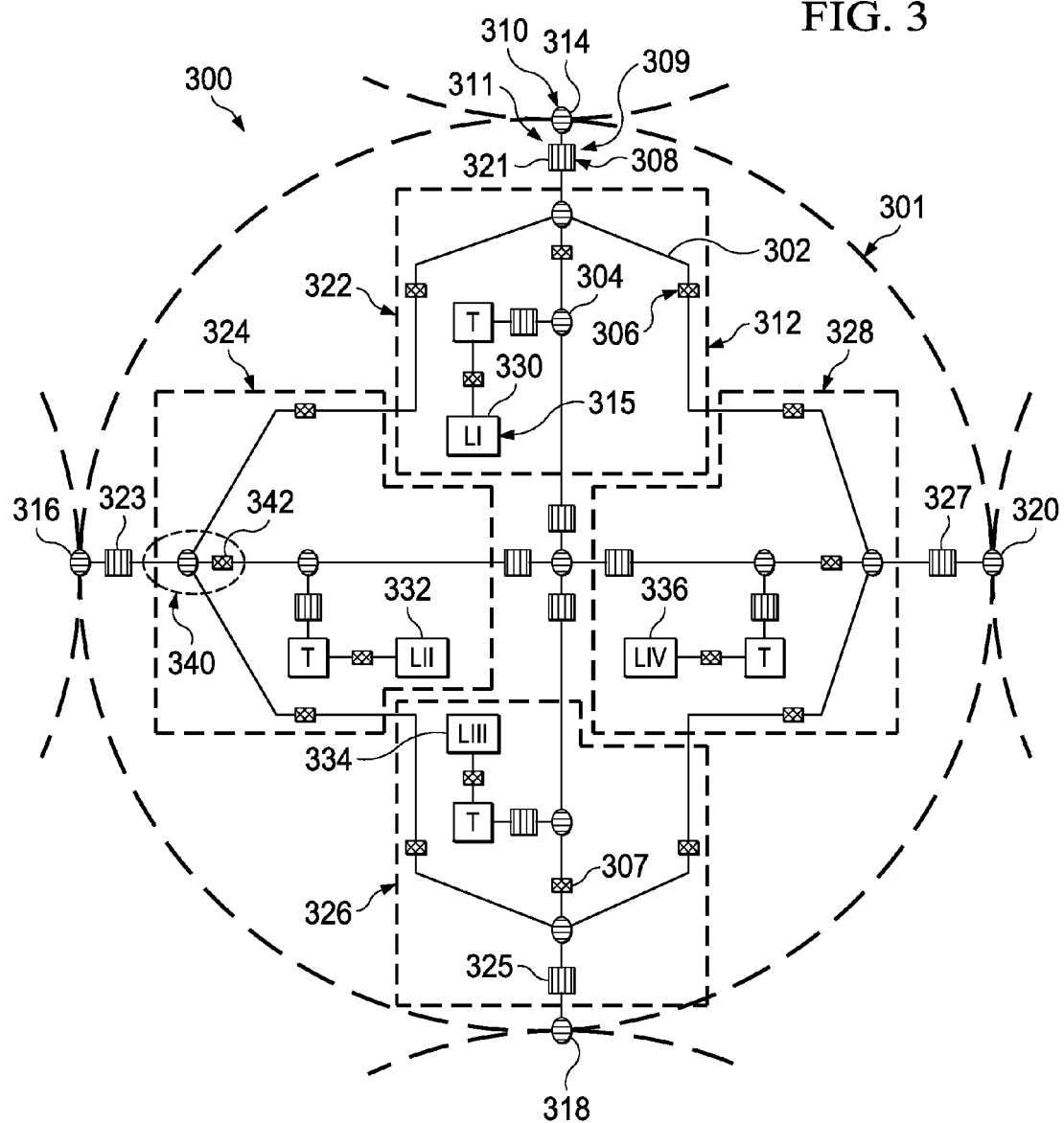
FIG. 3 is an illustration of a cell in accordance with an illustrative embodiment.

With reference now to FIG. 3, an illustration of a cell is depicted in accordance with an illustrative embodiment. Cell 300 is an example of one implementation for a cell in a power distribution grid, such as, for example, cell 110 in power distribution grid 100 in FIG. 1. Further, cell 300 may be used to implement any one of plurality of cells 202 in power distribution grid 200 in FIG. 2. Cell 300 is configured to distribute electrical energy to area 301.

In this illustrative example, cell 300 comprises electrical lines 302, nodes 304, monitoring devices 306, and control devices 308. Monitoring devices 306 form cell monitoring system 307 for cell 300. Cell monitoring system 307 is an example of one implementation for cell monitoring system 133 in FIG. 1. Monitoring devices 306 in cell monitoring system 307 are examples of one implementation for monitoring devices in plurality of monitoring devices 128 in FIG. 1. In this illustrative example, monitoring devices 306 take the form of power meters.

Further, control devices 308 form cell control system 309 for cell 300. Cell control system 309 is an example of one implementation for cell control system 146 in FIG. 1. Control devices 308 in cell control system 309 are examples of one implementation for control devices in plurality of control devices 138 in FIG. 1. Control devices 308 take the form of switches in this illustrative example.

As depicted, nodes 304 include plurality of entry nodes 310. Electrical energy may flow into cell 300 through one or more of plurality of entry nodes 310 into one or more of plurality of sectors 312 in cell 300. As used herein, a "sector" is a portion of a cell and may comprise any number of electrical lines and nodes. A cell, such as cell 300, may have any number of sectors. Further, a cell may have any number of subsectors. A subsector may be a sector within another sector.

For example, plurality of entry nodes 310 includes entry node 314, entry node 316, entry node 318, and entry node 320. Plurality of sectors 312 includes first sector 322, second sector 324, third sector 326, and fourth sector 328. Electrical energy may flow into first sector 322, second sector 324, third sector 326, and fourth sector 328 of cell 300 through entry node 314, entry node 316, entry node 318, and entry node 320, respectively.

In this illustrative example, control devices 308 include entry control devices 311. Entry control devices 311 control whether electrical energy flows from an entry node in plurality of entry nodes 310 to a sector in plurality of sectors 312. As depicted, entry control devices 311 include entry control device 321, entry control device 323, entry control device 325, and entry control device 327.

In particular, entry control device 321, entry control device 323, entry control device 325, and entry control device 327 control whether electrical energy is allowed to flow from entry node 314, entry node 316, entry node 318, and entry node 320, respectively, into first sector 322, second sector 324, third sector 326, and fourth sector 328 of cell 300, respectively.

Electrical energy that flows into plurality of sectors 312 may be delivered to set of loads 315 electrically connected to cell 300. As depicted, set of loads 315 include load 330, load 332, load 334, and load 336. Electrical energy that flows into first sector 322, second sector 324, third sector 326, and fourth sector 328 of cell 300 is delivered to load 330, load 332, load 334, and load 336, respectively.

In this illustrative example, cell control system 309 controls control devices 308 such that electrical energy may flow into a sector in plurality of sectors 312 through only one of plurality of entry nodes 310. However, each sector in plurality of sectors 312 may be configured to be electrically connected to each other by electrical lines 302.

Electrical lines 302 are configured to allow any sector in plurality of sectors 312 to have the capability to receive electrical energy that enters cell 300 from any one of plurality of entry nodes 310. Cell control system 309 determines which of electrical lines 302 may be used to deliver electrical energy to each load in set of loads 315.

In one illustrative example, cell control system 309 may determine that an undesired event has occurred at location 340 in area 301. This identification may be made based on data received from cell monitoring system 307. In particular, this identification may be made using data received from monitoring device 342 in monitoring devices 306.

Consequently, cell control system 309 uses control devices 308 to isolate location 340. In other words, cell control system 309 uses control devices 308 to reduce the flow of electrical energy into and out of location 340. The flow of electrical energy into and out of location 340 may be reduced to about zero. When the flow of electrical energy into location 340 is reduced to about zero, load 332 may be unable to receive electrical energy from second sector 324. As a result, cell control system 309 may reroute the flow of electrical energy through electrical lines 302 using control devices 308 such that load 332 may receive electrical energy supplied from one of first sector 322, third sector 326, and fourth sector 328.

In some illustrative examples, cell control system 309 may be configured to change load patterns within cell 300. For example, cell control system 309 may change the amount of electrical energy delivered to each load in set of loads 315. Further, in some cases, cell control system 309 may be configured to resolve undesired events that are detected within cell 300 to maintain a desired power quality and/or desired power stability without requiring a maintenance crew to be present.

Figure 4:
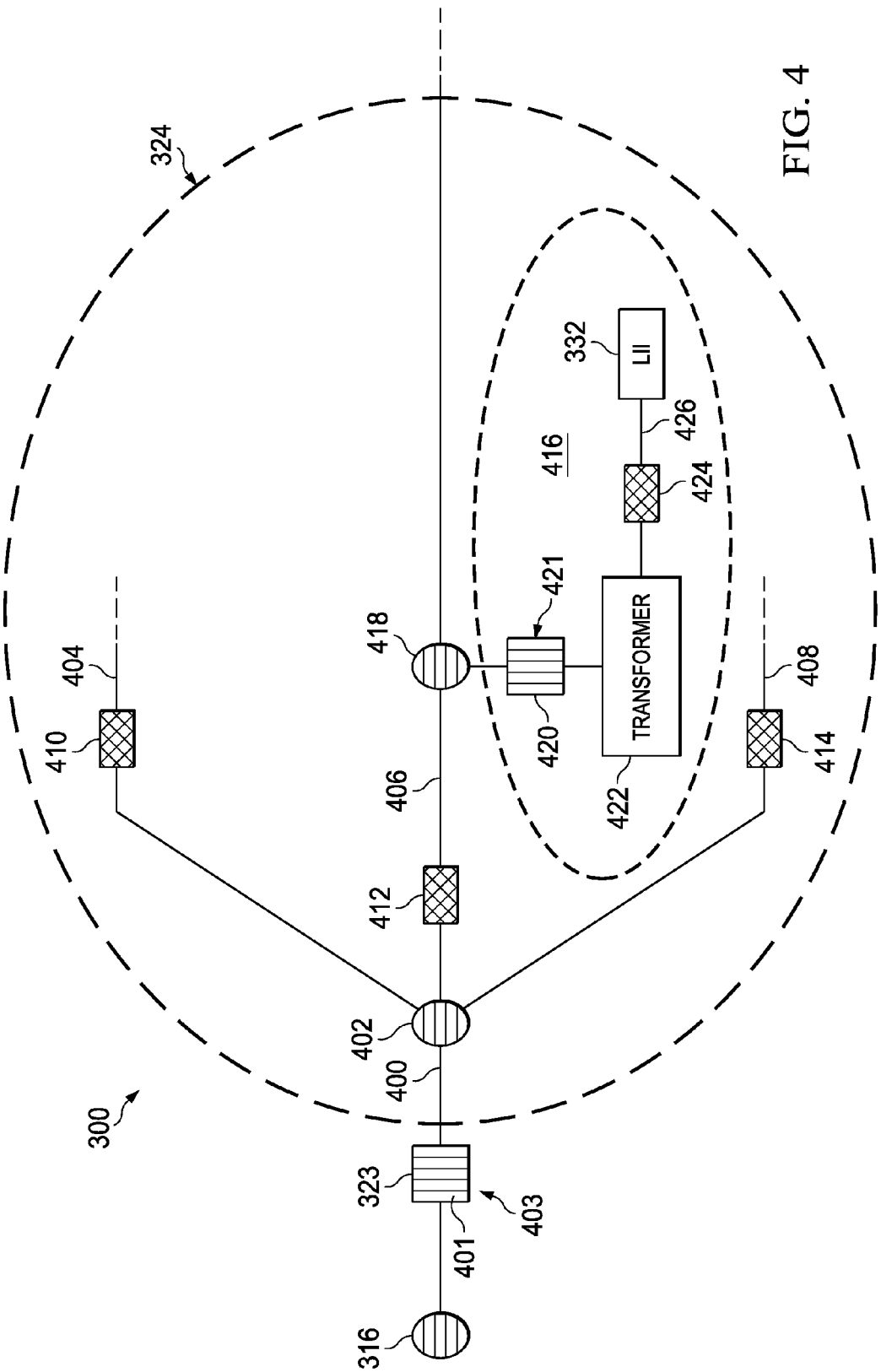
FIG. 4 is an illustration of a sector in a cell in accordance with an illustrative embodiment.

With reference now to FIG. 4, an illustration of a sector in a cell is depicted in accordance with an illustrative embodiment. In this illustrative example, second sector 324 from FIG. 3 is described in greater detail. As depicted, entry control device 323 controls the flow of electrical energy from entry node 316 into second sector 324 through electrical line 400.

Entry control device 323 may take the form of switch 401 in this illustrative example. Switch 401 is configured to control the flow of electrical energy through electrical line 400 at location 403. For example, switch 401 may electrically disconnect node 402 in second sector 324 from entry node 316 at location 403 along electrical line 400 to reduce and/or prevent the flow of electrical energy from entry node 316 into second sector 324. Further, switch 401 may electrically connect node 402 in second sector 324 to entry node 316 at location 403 along electrical line 400 to allow electrical energy to flow from entry node 316 into second sector 324. In this illustrative example, node 402 may be an entry node for second sector 324.

As depicted, electrical energy that flows into second sector 324 through node 402 may flow into electrical line 404, electrical line 406, and electrical line 408. Monitoring device 410 in second sector 324 is configured to monitor a set of parameters along electrical line 404. Monitoring device 412 in second sector 324 is configured to monitor a set of parameters along electrical line 406. Monitoring device 414 in second sector 324 is configured to monitor a set of parameters along electrical line 408. The sets of parameters monitored by monitoring device 410, monitoring device 412, and monitoring device 414 may be, for example, set of parameters 132 in FIG. 1.

Electrical energy may flow through electrical line 406 and into subsector 416 in second sector 324 of cell 300. Electrical energy may enter subsector 416 through node 418. Control device 420 in subsector 416 controls the flow of electrical energy from node 418 to transformer 422. For example, control device 420 may take the form of switch 421.

Transformer 422 is configured to convert this electrical energy from high voltage electrical energy to low voltage electrical energy. The low voltage electrical energy is then carried from transformer 422 to load 332 through electrical line 426. Monitoring device 424 monitors the flow of electrical energy from transformer 422 to load 332 through electrical line 426.

The illustrations of cell 300 in FIG. 3 and second sector 324 in FIG. 4 are not meant to imply physical or architectural limitations to the manner in which an illustrative embodiment may be implemented. Other components in addition to or in place of the ones illustrated may be used. Some components may be unnecessary. The different components shown in FIGS. 3-4 may be combined with components in FIG. 1, used with components in FIG. 1, or a combination of the two. Additionally, some of the components in FIGS. 3-4 may be illustrative examples of how components shown in block form in FIG. 3 can be implemented as physical structures.

For example, in some illustrative examples, electrical lines may be added to and/or removed from cell 300, second sector 324, and/or any one of plurality of sectors 312 in FIG. 3. Further, one or more additional loads may be electrically connected to a sector in plurality of sectors 312. In some cases, one or more of set of loads 315 may be electrically disconnected from a sector in plurality of sectors 312.

In still other illustrative examples, transformers, control devices, monitoring devices, circuit breakers, and/or other suitable types of components may be added to and/or removed from cell 300. In this manner, a cell, such as cell 300, may be implemented in a number of different ways. Further, cell 300 may change over time as different components are added to and/or removed from cell 300. For example, cell 300 may be modified over time to change the distribution of electrical energy to area 301 by cell 300. In particular, the loads electrically connected to cell 300 and/or the portions within area 301 supplied with electrical energy by cell 300 may grow over time.

Figure 5:
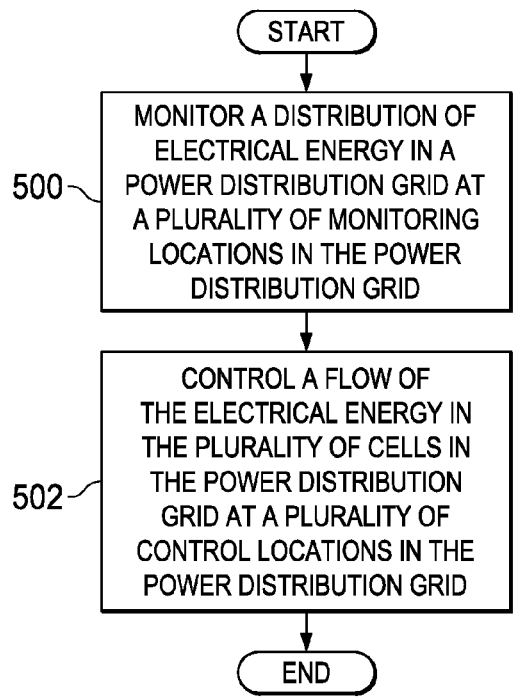
FIG. 5 is an illustration of a process for managing a distribution of electrical energy by a power distribution grid in the form of a flowchart in accordance with an illustrative embodiment.

With reference now to FIG. 5, an illustration of a process for managing a distribution of electrical energy by a power distribution grid in the form of a flowchart is depicted in accordance with an illustrative embodiment. The process illustrated in FIG. 5 may be implemented using power distribution grid 100 in FIG. 1 and, in particular, power management system 120 in FIG. 1.

The process begins by monitoring a distribution of electrical energy in a power distribution grid at a plurality of monitoring locations in the power distribution grid (operation 500). The power distribution grid comprises a plurality of cells configured to distribute the electrical energy to a plurality of areas. In these illustrative examples, each cell in the plurality of cells has a plurality of entry nodes configured to allow the electrical energy to flow into the cell.

Operation 500 may be performed using a monitoring system, such as, for example, monitoring system 122 in FIG. 1. The monitoring system may generate data for a set of parameters being monitored at each of the plurality of monitoring locations in the power distribution grid. This data may provide information about the health and status of the power distribution grid with respect to the plurality of monitoring locations.

The process then controls a flow of the electrical energy in the plurality of cells in the power distribution grid at a plurality of control locations in the power distribution grid (operation 502), with the process terminating thereafter. In operation 502, the flow of the electrical energy in a particular cell in the plurality of cells may be controlled independently of the flow of the electrical energy in other cells in the plurality of cells.

Operation 502 may be performed using a control system, such as, for example, control system 124 in FIG. 1. The control system may control the flow of electrical energy in the plurality of cells in operation 502 using the data generated during operation 500. Operation 500 and operation 502 may be performed continuously such that the health and status of the power distribution grid may be managed in substantially real-time. In operation 502, controlling the flow of electrical energy in the plurality of cells may be performed using data generated during operation 500.

Figure 6:
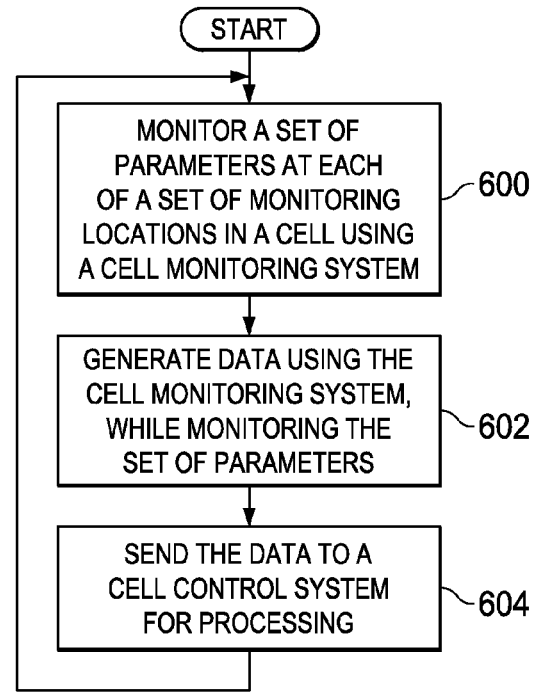
FIG. 6 is an illustration of a process for monitoring the distribution of electrical energy by a cell in a power distribution grid in the form of a flowchart in accordance with an illustrative embodiment.

With reference now to FIG. 6, an illustration of a process for monitoring the distribution of electrical energy by a cell in a power distribution grid in the form of a flowchart is depicted in accordance with an illustrative embodiment. The process illustrated in FIG. 6 may be used to implement operation 500 in FIG. 5. Further, this process may be used to monitor a particular cell in a plurality of cells in the power distribution grid.

This process may be implemented using monitoring system 122 in power management system 120 in FIG. 1. In particular, this process may be implemented using one of plurality of cell monitoring systems 131, such as, for example, cell monitoring system 133 in FIG. 1.

The process begins by monitoring a set of parameters at each of a set of monitoring locations in a cell using a cell monitoring system (operation 600). The set of parameters may include, for example, without limitation, at least one of voltage, current, electrical power, electrical energy, temperature, impedance, capacity, thermal conductivity, and other suitable types of parameters.

The process generates data using the cell monitoring system, while monitoring the set of parameters (operation 602). The data generated in operation 602 may include, for example, without limitation, at least one of values for the set of parameters, a report, a log, a spreadsheet, an alert, and other suitable information.

Thereafter, the process sends the data to a cell control system for processing (operation 604), with the process then returning to operation 600 as described above. Although this process has been described as a sequence of steps, operation 600, operation 602, and operation 604 may be performed continuously, in substantially real-time, and/or simultaneously in these illustrative examples.

Figure 7:
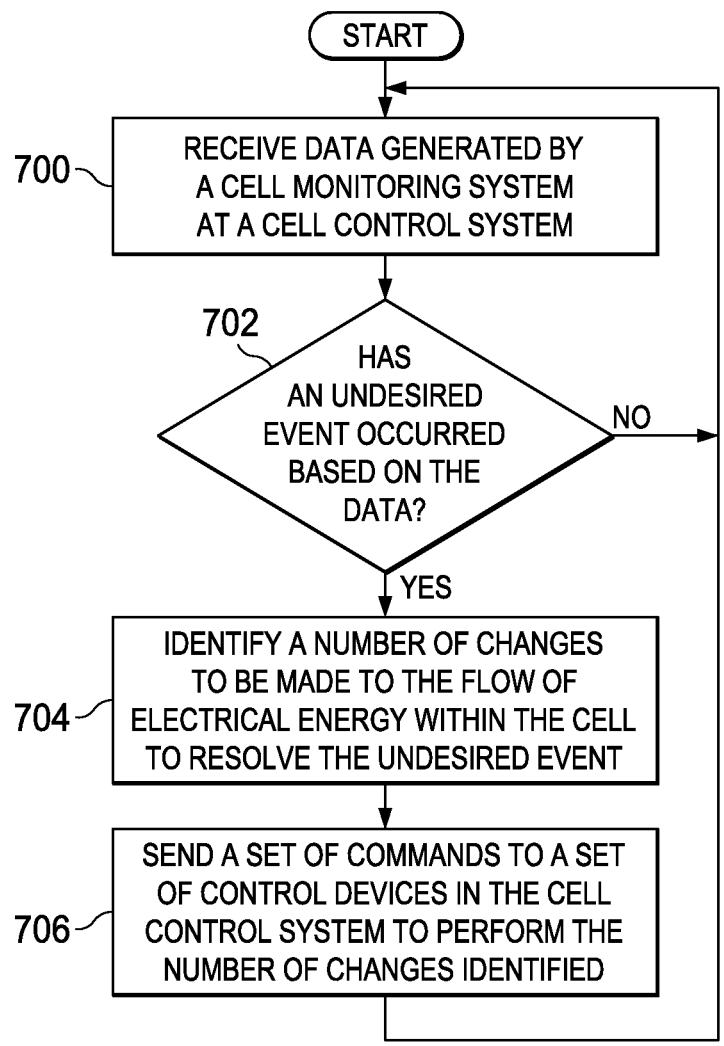
FIG. 7 is an illustration of a process for controlling a flow of electrical energy in a cell in a power distribution grid in the form of a flowchart in accordance with an illustrative embodiment.

With reference now to FIG. 7, an illustration of a process for controlling a flow of electrical energy in a cell in a power distribution grid in the form of a flowchart is depicted in accordance with an illustrative embodiment. The process illustrated in FIG. 7 may be used to implement operation 500 in FIG. 5. Further, this process may be used to control the flow of electrical energy within a particular cell in a plurality of cells in the power distribution grid.

This process may be implemented using control system 124 in power management system 120 in FIG. 1. In particular, this process may be implemented using one of plurality of cell control systems 144, such as, for example, cell control system 146 in FIG. 1.

The process begins by receiving data generated by a cell monitoring system at a cell control system (operation 700). In operation 700, the data received may be, for example, the data generated in operation 502 in FIG. 5. In some cases, in operation 700, the cell control system may receive additional information from a main control system and/or other suitable information. In these illustrative examples, operation 700 may be an operation that is performed continuously.

The process then determines whether an undesired event has occurred based on the data (operation 702). In some cases, the cell control system may use other information in addition to the data generated by the cell monitoring system to determine whether an undesired event has occurred. For example, the cell control system may use information received from a main control system, a policy, safety requirements, regulations, and/or other suitable information to make the determination in operation 702.

If the undesired event has not occurred, the process returns to operation 700 as described above. Otherwise, if an undesired event has occurred, the process identifies a number of changes to be made to the flow of electrical energy within the cell to resolve the undesired event (operation 704).

Thereafter, the process sends a set of commands to a set of control devices in the cell control system to perform the number of changes identified (operation 706), with the process then returning to operation 700 as described above. The set of control devices may be, for example, a set of switches.

In one illustrative example, the set of control devices may be controlled by the set of commands to isolate a location in which the undesired event has occurred, reroute the delivery of electrical energy to one or more loads electrically connected to the cell, and/or change the flow of electrical energy within the cell in some other suitable manner. In this manner, the cell may be configured to maintain a continuous supply of electrical energy to loads electrically connected to the cell even when undesired events occur within the cell.

Using the processes described in FIG. 5, FIG. 6, and FIG. 7, the health and status of a power distribution grid may be monitored in substantially real-time. Further, undesired events that may occur in a power distribution grid may be resolved with a desired expediency and efficiency. Still further, cells may be monitored and controlled independently of other cells in a power distribution grid. In this manner, the time and/or effort required to identify, investigate, and/or resolve an undesired event may be reduced.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Turning now to FIG. 8, an illustration of a data processing system is depicted in accordance with an illustrative embodiment. Data processing system 800 may be used to implement a processor unit in a control system, such as control system 124 and/or a processor unit in a monitoring system, such as monitoring system 122 in FIG. 1. In particular, data processing system 800 may be used to implement a processor unit in a control device, such as one of plurality of control devices 138 and/or a processor unit in a monitoring device, such as one of plurality of monitoring devices 128 in FIG. 1.

In this illustrative example, data processing system 800 includes communications framework 802, which provides communications between processor unit 804, memory 806, persistent storage 808, communications unit 810, input/output (I/O) unit 812, and display 814. In this example, communications framework 802 may take the form of a bus system.

Processor unit 804 serves to execute instructions for software that may be loaded into memory 806. Processor unit 804 may be a number of processors, a multi-processor core, or some other type of processor, depending on the particular implementation.

Memory 806 and persistent storage 808 are examples of storage devices 816. A storage device is any piece of hardware that is capable of storing information, such as, for example, without limitation, data, program code in functional form, and/or other suitable information either on a temporary basis and/or a permanent basis. Storage devices 816 may also be referred to as computer readable storage devices in these illustrative examples. Memory 806, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that may be connected to data processing system 800. For example, input/output unit 812 may provide a connection for user input through a keyboard, a mouse, and/or some other suitable input device. Further, input/output unit 812 may send output to a printer. Display 814 provides a mechanism to display information to a user.

Instructions for the operating system, applications, and/or programs may be located in storage devices 816, which are in communication with processor unit 804 through communications framework 802. The processes of the different embodiments may be performed by processor unit 804 using computer-implemented instructions, which may be located in a memory, such as memory 806.

These instructions are referred to as program code, computer usable program code, or computer readable program code that may be read and executed by a processor in processor unit 804. The program code in the different embodiments may be embodied on different physical or computer readable storage media, such as memory 806 or persistent storage 808.

Program code 818 is located in a functional form on computer readable media 820 that is selectively removable and may be loaded onto or transferred to data processing system 800 for execution by processor unit 804. Program code 818 and computer readable media 820 form computer program product 822 in these illustrative examples. In one example, computer readable media 820 may be computer readable storage media 824 or computer readable signal media 826.

In these illustrative examples, computer readable storage media 824 is a physical or tangible storage device used to store program code 818 rather than a medium that propagates or transmits program code 818. Alternatively, program code 818 may be transferred to data processing system 800 using computer readable signal media 826. Computer readable signal media 826 may be, for example, a propagated data signal containing program code 818.

For example, computer readable signal media 826 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 800 are not meant to provide architectural limitations to the manner in which different embodiments may be implemented. The different illustrative embodiments may be implemented in a data processing system including components in addition to and/or in place of those illustrated for data processing system 800. Other components shown in FIG. 8 can be varied from the illustrative examples shown. The different embodiments may be implemented using any hardware device or system capable of running program code 818.

Thus, the different illustrative embodiments provide a method and apparatus for managing a power distribution grid. In one illustrative embodiment, a power distribution grid comprises a plurality of cells configured to be electrically connected to each other and a power management system. A cell in the plurality of cells is configured to distribute electrical energy to an area corresponding to the cell. The cell has a plurality of entry nodes configured to allow the electrical energy to flow into the cell. The power management system is configured to manage a distribution of the electrical energy to the area by the cell independently of the distribution of the electrical energy to other areas by other cells in the plurality of cells.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A power distribution grid comprising:
a plurality of cells configured to be electrically connected to each other, wherein a cell in the plurality of cells is configured to distribute electrical energy to an area corresponding to the cell and wherein the cell has a plurality of entry nodes configured to allow the electrical energy to flow into the cell; and
a power management system configured to manage a distribution of the electrical energy to the area by the cell independently of the distribution of the electrical energy to other areas by other cells in the plurality of cells;
wherein the plurality of cells is formed by electrical lines and nodes in the power distribution grid and wherein the cell in the plurality of cells comprises:
a plurality of sectors configured to be electrically connected to each other such that a sector in the plurality of sectors is capable of receiving the electrical energy from more than one entry node in the plurality of entry nodes, wherein the sector is configured to deliver the electrical energy to a load electrically connected to the sector;
wherein each sector of the plurality sectors comprises an entry node for the sector and a load in the sector;
wherein a first entry node of the plurality of entry nodes is connected to a first smart switch associated with a first sector of the plurality of sectors;
wherein a first node in the first sector is connected to
the smart switch,
a first node of a second sector,
a second node of the first sector, and
a first node of a third sector;
wherein the connection between the first node of the first sector and the first node of the second sector includes
a first power monitor in the first sector, and
a first power monitor in the second sector;
wherein the second node of the first sector is connected to
the first node of the first sector,
a smart switch of the first sector, and
a second smart switch associated with the first sector; and
wherein the second smart switch associated with the first sector is connected to
a node of the cell that is connected to
the second smart switch associated with the first sector,
a second smart switch associated with the second sector,
a second smart switch associated with the third sector, and
a second smart switch associated with a fourth sector.

2. The power distribution grid of claim 1, wherein the power management system comprises:
a monitoring system configured to monitor the distribution of the electrical energy to the area by the cell independently of the distribution of the electrical energy to the other areas by the other cells in the plurality of cells; and
a control system configured to control the distribution of the electrical energy to the area by the cell independently of the distribution of the electrical energy to the other areas by the other cells in the plurality of cells.

3. The power distribution grid of claim 2, wherein the monitoring system comprises:
a plurality of monitoring devices configured to monitor a plurality of monitoring locations in the power distribution grid, wherein a monitoring device in the plurality of monitoring devices is configured to monitor a set of parameters at a corresponding monitoring location in the plurality of monitoring locations.

4. The power distribution grid of claim 3, wherein the plurality of monitoring devices forms a plurality of cell monitoring systems in which a cell monitoring system in the plurality of cell monitoring systems is configured to monitor the distribution of the electrical energy to the area by the cell independently of the distribution of the electrical energy to the other areas by the other cells in the plurality of cells.

5. The power distribution grid of claim 3, wherein the set of parameters includes at least one of voltage, current, electrical energy, electrical power, capacity, thermal conductivity, impedance, and temperature.

6. The power distribution grid of claim 3, wherein the monitoring device in the plurality of monitoring devices comprises at least one of a voltmeter, an ammeter, an ohmmeter, a power meter, a temperature sensor, a processor unit, and a communications unit.

7. The power distribution grid of claim 2, wherein the control system comprises:
   a plurality of control devices configured to control a flow of the electrical energy at a plurality of control locations in the power distribution grid, wherein a control device in the plurality of control devices is configured to control the flow of the electrical energy at a corresponding control location in the plurality of control locations.

8. The power distribution grid of claim 7, wherein the plurality of control devices forms a plurality of cell control systems in which a cell control system in the plurality of cell control systems is configured to control the distribution of the electrical energy to the area by the cell independently of the distribution of the electrical energy to the other areas by the other cells in the plurality of cells.

9. The power distribution grid of claim 7, wherein the control device is configured to control the flow of the electrical energy at the corresponding control location in the plurality of control locations by at least one of reducing an amount of the electrical energy that can flow through an electrical line at the corresponding control location, decreasing an impedance of the electrical line at the corresponding control location, increasing the impedance of the electrical line at the corresponding control location, and preventing the flow of the electrical energy through the electrical line at the corresponding control location.

10. The power distribution grid of claim 7, wherein the control device comprises at least one of a switch, a switchgear, a flexible alternating current transmissions device, a fuse, a circuit breaker, a smart switch, an electronic filter, a phase shifter, a transformer, an adapter, a sensor, a processor unit, and a communications unit.

11. The power distribution grid of claim 7, wherein the control system further comprises:
   a main control system configured to control the distribution of the electrical energy by the plurality of cells in the power distribution grid, wherein the main control system is configured to be in communication with the monitoring system and the plurality of control devices.

12. The power distribution grid of claim 2 further comprising:
   a communications network configured to allow communications between the monitoring system and the control system through at least one of a number of wireless communications links, a number of wired communications links, a number of electrical lines in the power distribution grid, and a number of optical communications links.

13. The power distribution grid of claim 1,
   wherein the area corresponding to the cell is one of a plurality of areas in a region that are distinct and do not overlap within the region;
   wherein the region is one of a geographical region, a city, an area in a city, a town, and a neighborhood; and
   wherein an entry node of the plurality of entry nodes electrically connects the cell to 14. The power distribution grid of claim 1,
   wherein the plurality of entry nodes includes four entry nodes;
   wherein the plurality of sectors includes four sectors;
   wherein the cell includes four loads, one in each of the four sectors;
   wherein each of the four entry nodes controls a flow of power into one of the four sectors;
   wherein the connection between the first node of the first sector and the second node of the first sector includes a second power monitor in the first sector;
   wherein the connection between the first node of the first sector and the first node of the third sector includes
      a third power monitor in the first sector and
      a first power monitor in the third sector;
   wherein the smart switch of the first sector is connected to
      the second node of the first sector and
      a transformer of the first sector; another cell of the plurality of cells.
   wherein the transformer of the first sector is connected to
      the smart switch of the first sector and
      a first load of the four loads that is in the first sector;
   wherein the connection between the transformer of the first sector and the first load includes a fourth power monitor in the first sector; and
   wherein the second smart switch associated with the first sector is connected to the second node of the first sector.

15. A power distribution grid comprising:
   a plurality of cells configured to be electrically connected to each other, wherein a cell in the plurality of cells is configured to distribute electrical energy to an area corresponding to the cell, wherein the cell has a plurality of entry nodes configured to allow the electrical energy to flow into the cell, and wherein the cell comprises:
      a plurality of sectors configured to be electrically connected to each other, wherein a sector in the plurality of sectors is configured to deliver the electrical energy to a load electrically connected to the sector and wherein the sector is configured to have a capability to receive the electrical energy from more than one entry node in the plurality of entry nodes;
   a monitoring system configured to monitor a distribution of the electrical energy to the area by the cell independently of the distribution of the electrical energy to other areas by other cells in the plurality of cells; and
   a control system configured to control the distribution of the electrical energy to the area by the cell independently of the distribution of the electrical energy to the other areas by the other cells in the plurality of cells;
   wherein each sector of the plurality sectors comprises an entry node for the sector and a load in the sector;
   wherein a first entry node of the plurality of entry nodes is connected to a first smart switch associated with a first sector of the plurality of sectors;
   wherein a first node in the first sector is connected to
      the smart switch,
      a first node of a second sector,
      a second node of the first sector, and
      a first node of a third sector;
   wherein the connection between the first node of the first sector and the first node of the second sector includes
      a first power monitor in the first sector, and
      a first power monitor in the second sector;
   wherein the second node of the first sector is connected to
      the first node of the first sector,
      a smart switch of the first sector, and a second smart switch associated with the first sector; and wherein the second smart switch associated with the first sector is connected to a node of the cell that is connected to the second smart switch associated with the first sector, a second smart switch associated with the second sector, a second smart switch associated with the third sector, and a second smart switch associated with a fourth sector.

16. A method for managing a power distribution grid, the method comprising:

monitoring a distribution of electrical energy in the power distribution grid at a plurality of monitoring locations, wherein the power distribution grid comprises a plurality of cells configured to distribute the electrical energy to a plurality of areas in which a cell in the plurality of cells has a plurality of entry nodes configured to allow the electrical energy to flow into the cell; and controlling a flow of the electrical energy in the plurality of cells in the power distribution grid at a plurality of control locations in which the flow of the electrical energy in the cell in the plurality of cells is controlled independently of the flow of the electrical energy in other cells in the plurality of cells;

wherein the step of controlling the flow of the electrical energy in the plurality of cells in the power distribution grid at the plurality of control locations comprises:

controlling a delivery of the electrical energy to a load electrically connected to a sector in a plurality of sectors in the cell, wherein the plurality of sectors is configured to be electrically connected to each other such that the sector is capable of receiving the electrical energy from more than one entry node in the plurality of entry nodes for the cell;

wherein each sector of the plurality sectors comprises an entry node for the sector and a load in the sector;

wherein a first entry node of the plurality of entry nodes is connected to a first smart switch associated with a first sector of the plurality of sectors;

wherein a first node in the first sector is connected to the smart switch, a first node of a second sector, a second node of the first sector, and a first node of a third sector;

wherein the connection between the first node of the first sector and the first node of the second sector includes a first power monitor in the first sector, and a first power monitor in the second sector;

wherein the second node of the first sector is connected to the first node of the first sector, a smart switch of the first sector, and a second smart switch associated with the first sector; and wherein the second smart switch associated with the first sector is connected to a node of the cell that is connected to the second smart switch associated with the first sector, a second smart switch associated with the second sector, a second smart switch associated with the third sector, and a second smart switch associated with a fourth sector.

17. The method of claim 16, wherein the step of monitoring the distribution of the electrical energy in the power distribution grid at the plurality of monitoring locations comprises:

monitoring the distribution of the electrical energy in the power distribution grid using a monitoring system comprising a plurality of monitoring devices configured to monitor a set of parameters at the plurality of monitoring locations in the power distribution grid, wherein the plurality of monitoring devices forms a plurality of cell monitoring systems in which a cell monitoring system in the plurality of cell monitoring systems is configured to monitor a corresponding cell in the plurality of cells.

18. The method of claim 17, wherein the step of monitoring the distribution of the electrical energy in the power distribution grid using the monitoring system comprising the plurality of monitoring devices configured to monitor the set of parameters at the plurality of monitoring locations in the power distribution grid comprises:

monitoring the distribution of the electrical energy in the power distribution grid using the monitoring system comprising the plurality of monitoring devices configured to monitor the set of parameters at the plurality of monitoring locations in the power distribution grid in which the set of parameters includes at least one of voltage, current, electrical energy, electrical power, capacity, thermal conductivity, impedance, and temperature and in which a monitoring device in the plurality of monitoring devices comprises at least one of a voltmeter, an ammeter, an ohmmeter, a power meter, a temperature sensor, a processor unit, and a communications unit.

19. The method of claim 16, wherein the step of controlling the flow of the electrical energy in the plurality of cells in the power distribution grid at the plurality of control locations comprises:

controlling the flow of the electrical energy in the plurality of cells in the power distribution grid using a control system comprising a plurality of control devices configured to control the flow of the electrical energy at the plurality of control locations in the power distribution grid, wherein the plurality of control devices forms a plurality of cell control systems in which a cell control system in the plurality of cell control systems is configured to control the flow of the electrical energy in a corresponding cell in the plurality of cells.

20. The method of claim 19, wherein the step of controlling the flow of the electrical energy in the plurality of cells in the power distribution grid using the control system comprising the plurality of control devices configured to control the flow of the electrical energy at the plurality of control locations in the power distribution grid comprises:

controlling the flow of the electrical energy in the plurality of cells in the power distribution grid using the control system comprising the plurality of control devices configured to control the flow of the electrical energy at the plurality of control locations in the power distribution grid, wherein a control device in the plurality of control devices comprises at least one of a switch, a switchgear, a flexible alternating current transmissions (FACTs) device, a fuse, a circuit breaker, a smart switch, an electronic filter, a phase shifter, a transformer, an adapter, a sensor, a processor unit, and a communications unit.

* * * * *